Figure 1:
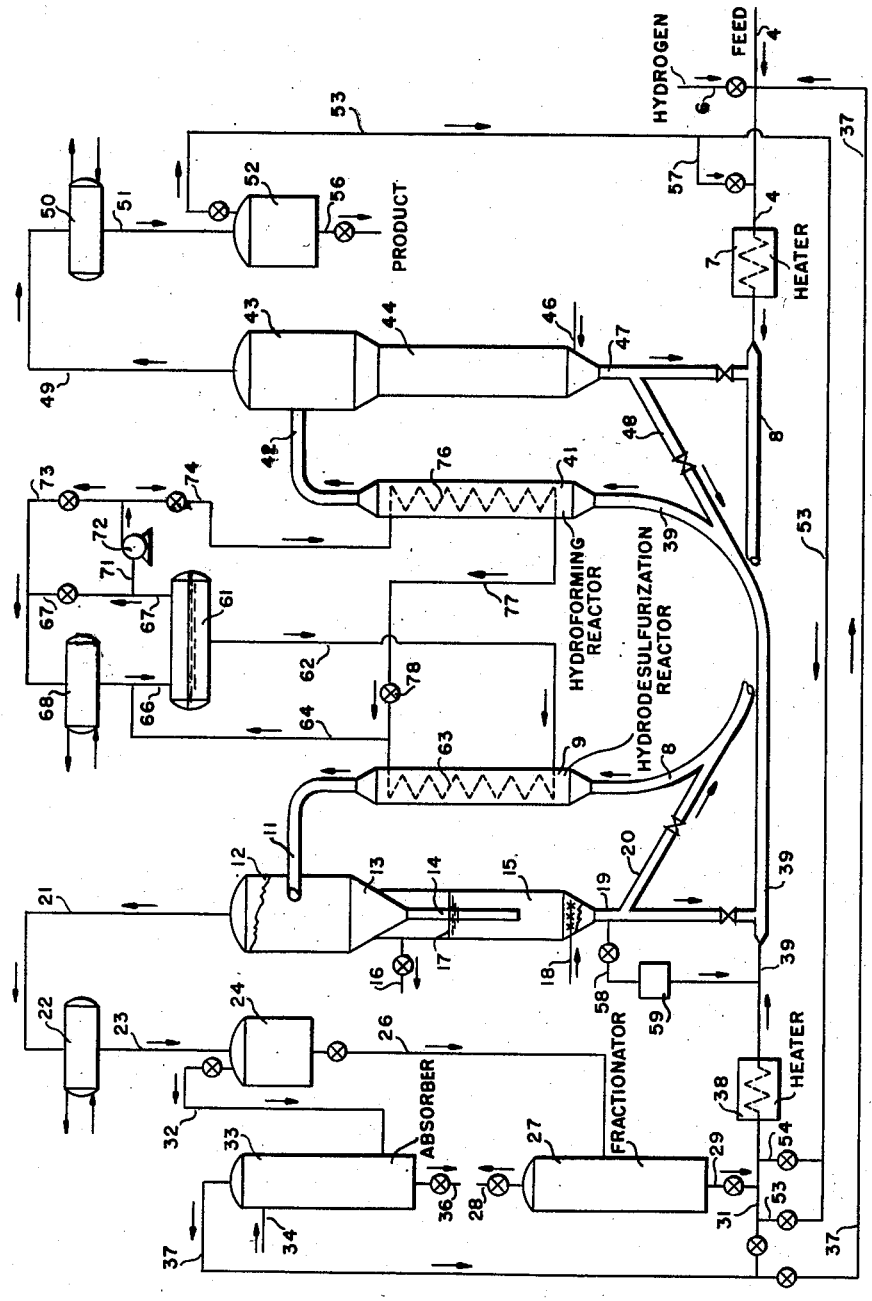

INVENTOR.
NORMAN L. DICKINSON
BY E.F. Liebrecht
Guzan Alexander
ATTORNEYS

June 16, 1953

N. L. DICKINSON 2,642,381

HEAT TRANSFER BETWEEN EXOTHERMIC
AND ENDOTHERMIC REACTIONS

Filed Aug. 27, 1949

2 Sheets-Sheet 2

*INVENTOR.*
NORMAN L. DICKINSON

BY E. F. Liebrecht
Cruzan Alexander
ATTORNEYS

Patented June 16, 1953

2,642,381

UNITED STATES PATENT OFFICE 2,642,381

HEAT TRANSFER BETWEEN EXOTHERMIC AND ENDOTHERMIC REACTIONS

Norman L. Dickinson, Basking Ridge, N. J., assignor to The M. W. Kellogg Company, Jersey City, N. J., a corporation of Delaware Application August 27, 1949, Serial No. 112,777

14 Claims. (Cl. 196—27)

The invention relates to heat transfer between an exothermic reaction and an endothermic reaction. In one aspect the invention relates to a method for transferring heat from a relatively low temperature exothermic reaction to a relatively high temperature endothermic reaction. In another aspect the invention relates to an integrated process for treating hydrocarbon distillate fractions by hydrodesulfurization and hydroforming.

There are numerous processes presently being operated or proposed which treat a feed stock by successive reactions such for example, as by hydrodesulfurization followed by hydroforming of a sulfur-containing naphtha fraction. In this example, the hydroforming reaction is endothermic, which reaction requires the addition of heat in order to maintain substantially isothermal temperature conditions. Although the prior hydrodesulfurization reaction is exothermic with the liberation of a considerable amount of heat, the hydrodesulfurization reaction is effected at the same or lower temperature than the subsequent hydroforming reaction. This characteristic of the two reactions prohibits direct heat exchange between the reaction zones so as to utilize the exothermic heat of reaction of the hydrodeulfurization step. The heat to the second or hydroforming step may be supplied by indirect heat exchange with a relatively high temperature fluid externally heated, or by the more usual manner of superheating the feed to the hydroforming step. In general, it may be said that either of the above methods are undesirable in an integrated process since they do not utilize the exothermic heat of reaction liberated in the hydrodesulfurization step. Superheating has the disadvantage of causing thermal decomposition of the feed. Supplying the endothermic heat of reaction by superheat is characterized by an undesirably large temperature gradient between the inlet and outlet of the reactor. Thus, the inlet temperature is above and the outlet is below the optimum for the reaction. It is much to be desired, therefore, to provide a method for utilizing the exothermic heat of reaction of the hydrodesulfurization step in the endothermic hydroforming step and also to provide a method for at least minimizing the temperature to which the feed to the hydroforming step must be preheated.

It is an object of this invention to provide a method for transferring heat from an exothermic reaction to an endothermic reaction in an integrated process in which the exothermic reaction is carried out at a temperature not higher than the temperature of the endothermic reaction.

Another object of this invention is to provide an improved method for treating a hydrocarbon distillate stock.

Another object of this invention is to provide an improved method for the hydrodesulfurization and hydroforming of a distillate.

It is a further object of this invention to provide a process for the removal of nitrogen and sulfur compounds from a hydrocarbon distillate.

Still another object of this invention is to provide a novel fluidized type of operation for the hydrodesulfurization of a hydrocarbon distillate.

Another object of this invention is to provide a novel type of fluidized process for the hydroforming of a hydrocarbon distillate.

It is a further object of this invention to provide a process for increasing the catalyst life in a hydrodesulfurization process and in a hydroforming process.

Various other objects and advantages will become apparent to those skilled in the art from the accompanying description and disclosure.

This invention applies specifically to an integrated process involving both exothermic and endothermic reaction steps on a common feed stock, said steps being effected at substantially the same temperature, or one of said steps being a relatively low temperature exothermic reaction and another of said steps being a relatively high temperature endothermic reaction. According to this invention, exothermic heat is made available for the endothermic reaction by vaporizing a liquid in indirect heat exchange with the exothermic reaction, compressing the vapors thus produced, thereby increasing their temperature and raising their temperature of condensation, condensing the vapors thus compressed in indirect heat exchange with the endothermic reaction and returning the liquid thus condensed to the system for repeating the cycle. The invention is adaptable to heat exchange between various types of chemical reactions employing catalyst in a stationary or fixed bed in which catalyst is contained in tubes surrounded by a heat exchange fluid, or in a fluidized condition, or even in the absence of a catalyst. The invention has particular applicability to a system in which reactant gases are passed at a relatively high velocity through a reaction zone in the presence of finely-divided catalyst under conditions such that the catalyst is suspended or entrained in the gaseous reaction mixture. The invention may be best understood by its application to a specific integrated process and the inventor has chosen for the description of this invention its application to an integrated process involving the successive steps of hydrodesulfurization and hydroforming of a sulfur-bearing hydrocarbon distillate. It is to be understood, however, that the invention has wider application to exothermic and endothermic reactions generally in which the exothermic heat is available at the same or lower temperature than the endothermic reaction. In the process to be described in connection with the preferred application of the invention, numerous novel features relative to specific steps of the hydrodesulfurization reaction and the hydroforming reaction will be discussed concurrently with the discussion of the heat transfer method of this invention.

Figures 2, 3:
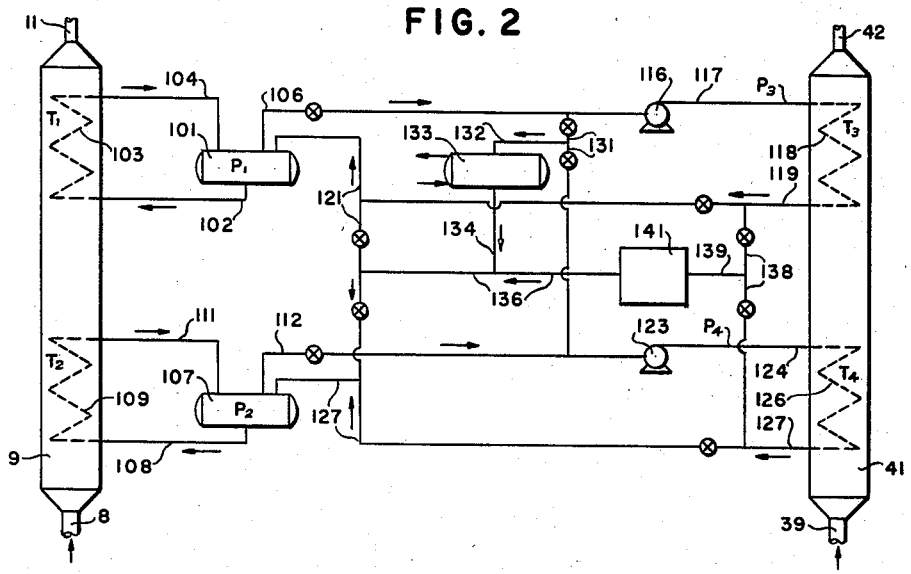

The accompanying drawings are elevational views, partly in cross section, diagrammatically illustrating a process and various arrangements of apparatus suitable for carrying out the present invention. Figure 1 of the drawings is an arrangement of apparatus and flow diagram of an integrated process for the hydrodesulfurization and hydroforming of a hydrocarbon distillate fraction containing organically combined sulfur. In Figure 1, a single heat exchange means is provided in each reaction zone. Figure 2 represents a diagrammatic illustration of a heat exchange system similar to that shown in Figure 1 except that multiple heat exchangers are employed in each of the reaction zones. Figure 3 diagrammatically illustrates a multi-stage hydrodesulfurization reaction system with multi-stage heat exchange.

According to Figure 1 of the drawing, 10,000 barrels per stream day of a dehexanized California cracked naphtha of the following characteristics are treated:

*Table I*

| | |
|---|---|
| Gravity, °API | 46.0 |
| A. S. T. M. distillation: | |
|   I. B. P., °F | 217 |
|   5% | 241 |
|   10% | 249 |
|   20% | 261 |
|   30% | 272 |
|   40% | 284 |
|   50% | 298 |
|   60% | 313 |
|   70% | 330 |
|   80% | 348 |
|   90% | 373 |
|   95% | 395 |
|   E. P. | 426 |
|   Recov., percent | 98.0 |
|   Residue | 1.3 |
|   Loss | 0.7 |
| Aniline point, °F | 89 |
| Octane number, CFRM | 69.4 |
| Reid vapor pressure, p. s. i. | 0.6 |
| Sulfur, wt. percent | 2.2 |
| Nitrogen, wt. percent | 0.20 |

Although Figure 1 is described with respect to a specific feed stock, the invention may be applied to the hydrodesulfurization of any straight run or cracked naphtha containing from about 0.05 to about 5 weight per cent sulfur and boiling within the range of about 100 to about 600° F. Preferably, the feed stock to be treated in accordance with a process of the type shown in Figure 1 boils within the range of about 250 to about 500° F. and has an A. P. I. gravity between about 40° and about 60°. In treating such a feed stock according to the process to be hereinafter described, 90 to about 100 per cent of the organic sulfur is converted to hydrogen sulfide and removed.

The aforesaid quantity of naphtha is introduced into the system through conduit 4 and it is admixed with about 62,500,000 standard cubic feet per day of hydrogen-containing gas which includes 7,500,000 standard cubic feet of make-up hydrogen from conduit 6 and 55,000,000 standard cubic feet of hydrogen-containing recycle gas from conduit 37 or 57. The mixture comprising hydrogen and naphtha is then passed through conduit 4 to a preheater and vaporizer 7 which preheats the mixture to a temperature substantially equivalent to the desired hydrodesulfurization which in this example is 850° F. The feed stock is pumped to the desired pressure by a pump, not shown. Since the process of Figure 1 involves both desulfurization and hydroforming and utilizes catalyst transfer between each of the aforesaid zones, it is preferred to effect both reactions at substantially the same pressure in order to minimize difficulties in the transfer of catalyst between zones. In the process illustrated, the pressure is 500 pounds per square inch gage.

From preheater 7, the vaporized feed stock is passed through conduit 8 to hydrodesulfurization reactor 9. Catalyst is introduced into transfer line 8 through a conduit or standpipe 47. This catalyst is a finely-divided solid material, the nature and composition of which will be discussed more fully hereinafter. The catalyst is suspended in the reaction gases and passes by entrainment to reactor 9. In reactor 9, the naphtha vapors pass upward through an elongated and enlarged reaction zone at a sufficiently high gas velocity that the catalyst particles are suspended and continuously move in the direction of flow of the gases in concurrent flow. The velocity of the gases should be above about 5 feet per second and may be as high as 40 or 50 feet per second in order to maintain the catalyst particles moving in the direction of flow of the gases and to prevent the formation of the conventional pseudo-liquid dense phase of catalyst particles characterized by the internal circulation of catalyst particles from top to bottom of the dense phase. Normally, the higher the velocity the more uniform is the flow of catalyst and gases. Thus, the higher velocities are preferred from the standpoint of the physical condition of the reaction mixture. However, higher velocities require longer reaction chambers, and, from a construction standpoint, lower velocities within the above range are preferable. The preferred velocities, taking into account both the physical condition of the reaction mixture and the length of the reaction chamber, are between about 6 and about 15 feet per second. Employing such relatively high velocities, the catalyst is entrained in a highly dispersed condition in the gaseous reactants in reactor 9. The concentration of the contact material under such conditions of velocity and a suitable loading rate is between about 1 and about 20 pounds per cubic foot. In comparison with the conventional pseudo-liquid dense phase of finely-divided contact material, this concentration is one-half or less of the density or concentration of catalyst in the dense phase.

At a space velocity of about 7 w./hr./w. (weight of naphtha per hour per weight of catalyst) and a reactor 3 feet 3 inches in inside diameter and 80 feet in length, a gas velocity of about 6.8 feet per second and a catalyst concentration in reactor 9 of about 25 pounds per cubic foot are suitable for the operation to achieve the desired conversion. In the operation shown in Figure 1, 90 to 100 per cent of the sulfur is converted to hydrogen sulfide, in the presence of a suitable catalyst. Nitrogenous organic compounds are also reduced to ammonia and hydrocarbons. The more reactive unsaturated compounds, such as mono-olefins and diolefins, are simultaneously hydrogenated to their corresponding saturated compounds. In the particular reaction illustrated in Figure 1, about 16,700,000 B. t. u.'s per hour of heat are released at a substantially isothermal temperature of about 850° F.

An effluent comprising desulfurized naphtha, hydrogen sulfide, hydrogen, relatively low boiling hydrocarbons and entrained catalyst is passed from reactor 9 through conduit 11 to separator 12. The effluent is introduced through conduit 11 tangentially into separator 12 to aid in the separation of solid contact material from the reaction effluent. A cyclone separator (not shown) may be positioned within separator 12 to aid in removal of catalyst dust from the reaction effluent. The cyclone separator contains a dip leg projecting into the lower portion of separator 12. Contact material substantially at the temperature of reactor 9 settles to the bottom of separator 12 and passes through a funnel shaped bottom portion 13 and through a standpipe or conduit 14 into a stripping zone 15 which may contain baffles or the like. The level of the catalyst bed in the stripping zone 15 is above the lower end of standpipe 14 as indicated by numeral 17. Stripping gas is introduced into the lower portion of stripper 15 through a conventional inlet conduit and distribution means 18. The stripping gas along with stripped material is withdrawn from the upper portion of stripper 15 through conduit 16 or may be passed directly into separator 12 by means not shown. The stripping gas removes tarry and carbonaceous deposits and occluded gases from the catalyst and may also condition the catalyst. A suitable stripping gas comprises any of the following: recycle gas, hydrogen, methane, carbon dioxide, steam, air, and nitrogen. The stripped catalyst is withdrawn from stripper 15 through conduit 19 and is passed to transfer line 39 of hydroforming reactor 41. In a modification of the invention, a portion or all of the catalyst may be recycled through conduit 20 to reactor 9. In general, it is preferable to recycle at least a portion of the stripped catalyst directly to reactor 9 in order to control the concentration of catalyst therein independent of catalyst circulation throughout the unit. The ratio of recycle catalyst to catalyst passed to reactor 41 is usually about 10:1.

The effluent from reactor 9, as previously discussed, is removed from the upper part of separator 12 and is substantially free from entrained or suspended catalyst. However, in order to remove the last traces of suspended catalyst, this effluent is passed through metallic filters (not shown) or other known means of dust recovery and then passed through conduit 21, condenser 22, conduit 23 to accumulator 24. Condenser 22 represents a single or series of condensation units at the same or successively lower pressures and temperatures. Preferably, operating pressure is employed on the condensation unit 22 and accumulator 24. The temperature of the effluent after passage through condensing unit 22 is about 100° F. In accumulator 24, the desulfurized naphtha is collected and passed through conduit 26 to separating unit 27 which represents conventional equipment for the fractionation and separation of a naphtha suitable for use in the subsequent hydroforming step. This naphtha stream is free of $C_3$ hydrocarbons and lighter, preferably free of $C_6$ hydrocarbons and lighter. Ordinarily, separating unit 27 is of conventional design suitable for removal of the dissolved hydrogen sulfide, ammonia and relatively low boiling hydrocarbons, such as ethane and propane. These gases are removed from separating unit 27 through conduit 28. Desulfurized naphtha is withdrawn from separating unit 27 through conduit 29 and is introduced into transfer line 31 of hydroforming reactor 41. The desulfurized naphtha in this example has approximately the following properties:

| | |
|---|---|
| Grav., °API | 54.2 |
| A. S. T. M. distillation: | |
| I. B. P., °F | 143 |
| 5% | 197 |
| 10% | 214 |
| 20% | 238 |
| 30% | 255 |
| 40% | 269 |
| 50% | 280 |
| 60% | 293 |
| 70% | 306 |
| 80% | 324 |
| 90% | 350 |
| 95% | 370 |
| E. P | 415 |
| Recov., per cent | 98.0 |
| Residue | 1.0 |
| Loss | 1.0 |
| Aniline point, °F | 120 |
| Octane number, CFRM | 55 |
| Reid vapor pressure, p. s. i. | 1.5 |
| Sulfur, wt. per cent | 0.04 |
| Nitrogen, wt. per cent | 0.07 |

The vapor phase of accumulator 24, comprising hydrogen sulfide, ammonia, hydrogen and relatively low boiling hydrocarbons, is removed therefrom through conduit 32 and passed to a conventional extraction unit 33 in which the vapors are countercurrently contacted with a downwardly flowing absorption medium comprising, for example, aqueous diethanol amine. The rich absorption medium is withdrawn from extractor 33 through conduit 36 and passed to a conventional stripping or desorption unit (not shown) in which the hydrogen sulfide and ammonia are stripped from the absorption medium. The stripped absorption medium is thereafter returned to the upper portion of extraction unit 33 through inlet conduit 34. The gaseous effluent from extraction unit 33 comprises hydrogen and methane, ethane and propane. This gaseous stream is recyled through conduit 37 to conduit 4 in order to supply the excess hydrogen to the hydrodesulfurization reaction. In the example described in Figure 1, the quantities of net materials, excluding recycle from hydrodesulfurization unit 9 are approximately as follows:

Hydrogen sulfide, 31.8 tons per day
Ammonia, 2.2 tons per day
$C_1$ to $C_3$ gas (conduit 28), 600,000 standard cubic feet per day
Desulfurized naphtha (conduit 29), 10,220 barrels per stream day If desired, a portion of the gas in conduit 37 may be by-passed to conduit 31 leading to hydroforming unit 41, as shown. In most instances, however, all of the gas through conduit 37 is returned to conduit 4.

The desulfurized naphtha is now hydroformed to improve the octane value thereof by increasing its aromatic content. This is accomplished by passing liquid desulfurized naphtha through conduit 29 to conduit 31 and thence to a heating and vaporizing zone 38. Recycle gas from the hydroforming unit 41 containing hydrogen and relatively low boiling hydrocarbons is introduced into this stream prior to vaporizer 38 through conduits 53 and 54, as shown. In vaporizer 38, the naphtha is vaporized and preheated to about the hydroforming temperature employed in hydroforming reactor 41. If desired, the recycle gases in conduit 53 may be introduced into the naphtha feed line after vaporizer 38 by means not shown. In such a case an additional preheater, not shown, must be included on recycle line 53.

The quantity of recycle gas is approximately 51,000,000 standard cubic feet per day. The mixture of vaporized naphtha and recycle gas passes at a relatively high velocity through conduit or transfer line 39 to hydroforming reactor 41 of enlarged cross section similar in design to reactor 9. Catalyst is picked up in conduit 39 from conduit or standpipe 19. In reactor 41 the gas velocity is between about 5 and about 50 feet per second in order to entrain the catalyst particles in a relatively dispersed condition in the gaseous reactants. The physical condition of the catalyst and gases in hydroforming reactor 41 is substantially the same as that described with respect to hydrodesulfurization reactor 9.

At the temperature of reaction of about 925° F. and a pressure of about 480 pounds per square inch gage for hydroforming reactor 41, the principal reaction is the dehydrogenation of naphthenic hydrocarbons to aromatics. To a somewhat lesser extent aliphatic hydrocarbons are dehydrogenated and cyclicized to aromatic compounds. Some cracking also occurs, but the hydrogen pressure is sufficiently high to saturate substantially all of the cracked products and to substantially suppress polymerization reactions leading to compounds higher boiling than the feed. The combined effect of these reactions is endothermic. The external heat required to maintain substantially isothermal conditions of approximately 925° F. is 16,200,000 B. t. u.'s per hour.

The gaseous effluent containing entrained finely-divided contact material is withdrawn from hydroforming reactor 41 through conduit 42 and introduced tangentially into separator 43. In separator 43, the contact material is separated from the gaseous effluent and is passed into a stripping zone 44. In stripping zone 44, tarry and carbonaceous deposits and occluded gases are removed from the contact material. Stripping gas is introduced into stripper 44 through conduit 46 and comprises similar gases as described with respect to stripper 15 hereinbefore described. The construction and operation of separator 43 and stripper 44 are substantially the same as described with respect to separator 12 and stripper 15. Stripped catalyst is removed from stripper 44 through conduit 47 and is passed to transfer line 8 from where it is returned to hydrodesulfurization reactor 9 and the cycle repeated. However, a portion or all of the catalyst may be passed through conduit or standpipe 48 for recycle to hydroforming unit 41 in order to control the concentration of catalyst therein independent of catalyst circulation throughout the entire two stages of the unit. Generally, the quantity of catalyst recycled to the quantity of catalyst passed to transfer line 8 is about 10:1.

A gaseous effluent comprising treated naphtha, hydrogen and relatively low boiling hydrocarbons is removed from separator 43 through conduit 49 and is passed through a condenser 50, a conduit 51 to an accumulator 52. Any catalyst dust in the effluent may be removed prior to condensation by conventional means, as previously discussed. Condenser 50 may comprise a single or series of condensation units similar to unit 22 which reduce the temperature of the effluent to about 100° F. and condense the naphtha. Treated naphtha is withdrawn as a product of the process from accumulator 52 through conduit 56 and is generally stabilized and rerun before blending into finished gasoline. The quality and characteristics of the stabilized and rerun naphtha product are shown in Table IV below:

| | |
|---|---|
| Grav., ° API | 52.0 |
| A. S. T. M. distillation: | |
| I. B. P., ° F. | 103 |
| 5% | 163 |
| 10% | 186 |
| 20% | 212 |
| 30% | 228 |
| 40% | 240 |
| 50% | 251 |
| 60% | 263 |
| 70% | 276 |
| 80% | 295 |
| 90% | 327 |
| 95% | 352 |
| E. P. | 400 |
| Recov., per cent | 97.5 |
| Residue | 1.0 |
| Loss | 39 |
| Octane Number, CFRM | 86.9 |
| Reid vapor pressure, p. s. i. | 6.5 |
| Sulfur, wt. per cent | 0.015 |
| Nitrogen, wt. per cent | 0.06 |

Uncondensed vapors comprising hydrogen and relatively low boiling hydrocarbons are removed from accumulator 52 and a portion subjected to conventional recovery processes to recover gasoline boiling range constituents, and another portion is passed through conduit 53 as recycle to the process. This gaseous material is recycled through conduit 53 to conduit 31 and, in some instances, a portion may be passed through conduit 57 to conduit 4 and thence to hydrodesulfurization reactor 9.

The quantity of materials obtained as net product of the process from hydroformer 41, excluding recycle, is approximately as follows:

Make gas (C₁-C₃ and H₂), 9,100,000 standard cubic feet per day
100% C₄ gasoline, 8,350 barrels per stream day
400° F. polymer, 200 barrels per stream day The make gas is rich in hydrogen and it may, therefore, be subjected to fractional separation so as to supply a part of the hydrogen consumed in the hydrodesulfurization step.

Ordinarily, some regeneration of the catalyst is necessary. It is preferred, therefore, to remove the catalyst for this purpose from conduit or standpipe 19 through conduit 58, or alternatively or additionally from conduit 47 by means not shown, and pass it to a conventional regeneration zone 59. In regeneration zone 59, the finely-divided contact material is contacted with oxygen or air at an elevated temperature between about 700° and about 1200° F. to burn off carbonaceous deposits thereon. The hot regenerated catalyst may be used to supply a portion of the heat for the hydro forming reaction. The catalyst may also be reduced, if desired, without departing from the scope of this invention. Fresh catalyst may be introduced into the system at the same point as the regenerated catalyst.

Although the make-up hydrogen for the process, as described, is introduced into conduit 4 through conduit 6, this make-up hydrogen may be introduced conveniently as the stripping gas to stripper 15 through conduit 18. In such a case, the stripping gas is passed by means not shown from stripper 15 into separator 12 where it is admixed with the effluent from hydrodesulfurization zone 9. The make-up hydrogen is then ultimately recycled through conduit 37 to feed line 4. The stripping gas may be heated to aid in stripping and in maintaining conditions conducive to the removal of deposits by reactions such as hydrogenation or oxidation.

Specific reaction conditions have been stated for the example described in connection with the process of Figure 1. These particular operating conditions should not be construed as unnecessarily limiting to the present invention. Both the hydrodesulfurization reaction and the hydroforming reaction may be carried out over a wide range of operating conditions. The temperature employed for hydrodesulfurization may be any temperature between about 500 and about 1000° F., preferably between about 700 and about 925° F. The temperature of reaction of hydroforming may be between about 850 and about 1050° F., preferably between about 875 and about 950° F. and, in general, higher than the temperature employed for the hydrodesulfurization step. The pressure employed for the hydrodesulfurization step is between about 200 and about 4000 pounds per square inch gage, preferably between about 300 and about 1200 pounds per square inch gage. The pressure for the hydroforming step is between about 100 and about 1000 pounds per square inch gage, preferably between about 200 and about 750 pounds per square inch gage. Since the catalyst is circulated between the hydrodesulfurization zone and the hydroforming zone, it is preferred to operate both of these reaction zones at substantially the same pressure. Thus, in the type of operation described with respect to Figure 1 in which catalyst is circulated between the reaction zones, it is preferred to use substantially the same pressure in each of the reaction zones within the range of about 300 to about 750 pounds per square inch gage. When catalyst is not circulated between the reaction zones the use of different pressures in the reaction steps is feasible and, under such circumstances, relatively higher pressures are employed in the hydrodesulfurization step than in the hydroforming step, but within the range previously stated. It is preferred to use relatively high pressures, particularly in the hydrodesulfurization step, in order to minimize the formation of coke.

In the hydrodesulfurization step, the mol ratio of hydrogen to charging stock is generally between about 1:1 and about 30:1, preferably between about 2:1 and about 9:1. In the hydroforming step, the mol ratio of hydrogen to naphtha feed charged from the hydrodesulfurization step is less than that employed in the hydrodesulfurization and is generally between about 1:1 and about 8:1.

The space velocity in weight of liquid charged per hour per weight of catalyst in the hydrodesulfurization reaction zone is between about 0.3:1 and about 15:1, preferably between about 1:1 and about 5:1. The space velocity in similar terms for hydroforming is between about 0.2:1 and about 5:1, preferably between about 0.3:1 and about 2:1.

Variations in the operating conditions between the reaction zones may be achieved in conventional manner. Desired temperatures may be obtained by the method to be discussed hereinafter. Variations in mol ratio of hydrogen to naphtha charge can be achieved by appropriate recycle ratios and the particular quantity and location of the introduction of make-up hydrogen. Space velocity is controlled by the rate of feed charged or the rate of circulation of catalyst to the respective reaction zones.

The gas recycle rate to each of the reaction zones is between about 2000 and about 15,000 standard cubic feet per barrel of naphtha charged, preferably between about 4000 and about 10,000 standard cubic feet per barrel of naphtha charged.

In general, the catalysts used in the process of Figure 1 comprise the oxides of the metals of the left-hand column of group VI of the periodic table; particularly chromium, molybdenum, and tungsten are preferred, but other metallic oxides and other metallic compounds, particularly the oxides of the metals of the left-hand column of groups IV and V of the periodic table, such as titanium, serium, thorium and vanadium may be used. The sulfides as well as the oxides of the various metals may be employed, if desired. The metals and their sulfides of group VIII of the periodic table may also be used, such as platinum, palladium, nickel and cobalt. While these catalytic oxides and sulfides can be used alone, it is preferable to use them on a suitable supporting material, such as magnesia or alumina, particularly an activated alumina or an alumina gel support. In general, catalytic oxides or other catalytic compounds are present as the minor constituents of the overall catalyst mass, usually from 1 to 40 percent by weight of the total catalyst mass, including the support. It is also within the scope of this invention to use a mixture of catalysts. Preferred catalysts comprise cobalt molybdate, molybdenum oxide, tungsten sulfide, tungsten nickel sulfide, tungsten molybdenum sulfide, unsupported or supported on activated alumina or alumina gel. When the catalyst is not circulated between the hydrodesulfurization zone and the hydroforming zone, two different catalysts may be employed in each of these zones. For example, cobalt molybdate may be employed as a catalyst for the hydrodesulfurization reaction and molybdenum or chromium oxide may be employed as the hydroforming catalyst.

Preferably, the finely-divided catalyst of this invention contains no more than a minor proportion by weight of material whose particle size is greater than about 250 microns. The greater proportion of the catalyst mass preferably comprises a material whose particle diameter is smaller than 100 microns, including at least 25 per cent of a material having a particle size smaller than 40 microns. An example of a desirable powdered catalyst is one which comprises at least 75 per cent by weight of a material smaller than 150 microns and at least 25 per cent by weight of a material smaller than 40 microns.

Although Figure 1 has been described with reference to an upwardly flowing gaseous stream of reactants and catalyst through the respective reaction zones, it should be understood that the catalyst and reactants may flow together downwardly, horizontally, circularly or even angularly through a reaction zone at a relatively high velocity without departing from the scope of this invention. However, it has been found that by upward flowing of the gases through a substantially vertical reaction zone the entrainment of the catalyst and the residence time thereof may be controlled conveniently and accurately and the tendency for segregation and stratification of the catalyst is minimized.

Extraneous feed stocks, such as naphthas or kerosene, may be introduced into the system between stages, such as into conduit 31 by means not shown. Steam may also be used to replace at least a portion of the added hydrogen in the process. Thus, for example, steam may be introduced into conduit 4 through conduit 6 and the steam reacts with the sulfur in hydrodesulfurizer 9 to produce hydrogen sulfide.

According to this invention the exothermic heat liberated by the hydrodesulfurization reaction is transferred to the endothermic hydroforming reaction by indirect heat exchange between the reaction zones with the use of a coolant vapor compressor. The reactions are maintained under substantially isothermal conditions in the following manner: A suitable vaporizable liquid medium, such as mercury, is passed from reservoir 61 through conduit 62 to heat exchanger 63. The liquid, which in the example of Figure 1 is mercury, is vaporized in heat exchanger 63 which is suitably disposed in hydrodesulfurizer 9 in heat exchange with the reactants. The pressure of the mercury is held at about 40 pounds per square inch gage, of which pressure the vaporization temperature is about 825° F. in heat exchanger 63. As previously discussed, the hydrodesulfurization reaction of the example of Figure 1 liberates about 16,700,000 B. t. u.'s per hour which in turn evaporates about 141,000 pounds of mercury per hour. The evaporation of the mercury absorbs the exothermic heat of reaction of reactor 9 by latent heat of vaporization.

The mercury vapor thus evaporated is removed from heat exchanger 63 through conduit 64 and returned to reservoir 61. Reservoir 61 is maintained at the operating pressure of about 40 pounds per square inch gage. Mercury vapors are removed from reservoir 61 through conduit 67 and passed through conduit 71 to a two-stage turbo-compressor 72 in which the vapor is compressed to a pressure of 120 pounds per square inch gage and the temperature is raised to about 1175° F. Two stages of compression with interstage-cooling are used because the low specific heat of the mercury vapor results in a tendency towards excessive temperature rise during compression. The compressed mercury at a temperature of about 1175° F. and about 120 pounds per square inch gage is passed from compressor 72 through conduit 74 to heat exchanger 76. Mercury vapor flows through heat exchanger 76 in indirect exchange with the reactant gases in hydroformer 41 and supplies the 16,200,000 B. t. u.'s per hour of heat required for hydroformer 41. The removal of heat from the mercury vapor at the 120 pounds pressure results in its condensation at approximately 950° F. in heat exchanger 76. Liquid mercury is removed from heat exchanger 76 through conduit 77 and is expanded through expansion valve 78 into conduit 64. During expansion of the mercury in valve 78, a small portion of the mercury is again vaporized. The mercury in conduit 64 is recycled to reservoir 61.

Since the hydroforming heat duty is slightly less than that removed from the hydrodesulfurization reactor and also because of the heat added to the compressed vapor as work, the quantity of vapor required to be condensed in exchanger 76 is less than that vaporized in heat exchanger 63, this amount being about 133,000 pounds per hour. The remainder or about 8,000 pounds per hour of mercury vapor plus the amount resulting from the flashing of the 120 pounds per square inch gage mercury condensate through valve 78 are passed from reservoir 61 through conduit 67 to condenser 68 to remove excess heat and the resulting condensate returned to reservoir 61, as shown, in order to balance the system.

The operation of compressor 72, which has an overall efficiency of about 70 per cent, consumes about 800 horsepower. Since the heat equivalent of one horsepower hour is about 2,545 B. t. u.'s, 16,200,000 B. t. u.'s per hour are recovered and made available at the higher temperature level required for hydroformer 41 at an energy cost corresponding to only about 2,040,000 B. t. u.'s per hour.

As shown in elevation, the condensate from condenser 68 is passed to reservoir 61 by the static head of the condensate in the conduit connecting condenser 68 and reservoir 61. Should this static head be insufficient to pass the condensate from condenser 68 to reservoir 61, the required amount of vapors to balance the system may be removed from the downstream side of compressor 72 through conduit 73 and passed to condenser 68 at an elevated pressure.

While mercury is used as a thermodynamic fluid or heat transfer medium in the example of Figure 1, any stable high-boiling liquid may be used without departing from the scope of this invention. Preferably, the boiling point of the heat transfer medium should be about 800° F. or lower in order to avoid sub-atmospheric pressures on the heat input side. Another suitable high-boiling heat exchange fluid for use in the present system is a close-cut fraction of the hydroformer polymer itself produced by the chemical process shown in Figure 1. This high-boiling polymer is highly aromatic and, therefore, heat stable. Although heat exchange with reactor 9 is shown as downflow and with reactor 41 as upflow, heat exchange with the reactors may be both upflow or both downflow without departing from the scope of this invention.

The indirect transfer of heat from the low temperature exothermic reaction to the high temperature endothermic reaction in the manner described is highly advantageous since it minimizes the amount of preheating necessary for the hydroformer feed stock. As would be obvious, the use of high preheat temperatures characteristic of the prior art results in undesirable thermal decomposition and also makes it impossible to obtain isothermal conditions in the reaction zone.

The high velocity system shown for both hydrodesulfurization and hydroforming has certain particular advantages which make such a system preferable to conventional fluidized dense phase catalyst operations. Hydrodesulfurization and hydroforming are not like many reactions, such as the hydrogenation of carbon monoxide to produce organic compounds, which reactions may be effected at low conversions per pass with recycling of the reactants to increase the overall conversion. In the type of reactions discussed in this application, high conversions must be achieved, if at all, in a single pass without recycling. In fluidized dense phase operations due to the low gas velocities, high conversions per pass are difficult. This difficulty arises from the internal circulation of reactants and catalyst in the reactor resulting in ample residence time for some material but insufficient residence time for other material. The high velocity system for concurrent flow of catalyst and reactants obviates the above difficulties. In the high velocity system both the residence time of the catalyst and reactants are under control inasmuch as there is a minimum of internal circulation. Substantially complete removal of sulfur can be obtained in a single pass by the high velocity technique.

Numerous other advantages are apparent with the high velocity system which cannot be obtained readily with a conventional fluidized dense phase operation. In the high velocity system the residence time of the catalyst in the reaction zone is relatively short as compared to the dense phase type of operation and between each pass of the catalyst through the cycle of the high velocity system the catalyst is stripped of tarry and carbonaceous deposits and occluded gases. This frequent stripping of the materials maintains the catalyst at its maximum activity and increases the life of the catalyst; in some cases eliminating entirely regeneration of the catalyst. The high dispersion and rapid movement of the catalyst in the high velocity type of operation also minimize the sticking together of the catalyst particles as a result of the accumulation of tarry and carbonaceous deposits thereon. The dispersed condition also accounts for a more smooth reaction and minimizes the chance for overheating frequently accompanying exothermic reactions. The high velocity system also is characterized by full control of the concentration of the catalyst in the reaction zone, this concentration being a direct function of the velocity of the reactants and the loading rate of the catalyst into the gas stream. This is not true of the dense phase operation where the concentration is essentially a function of the velocity only. Still a further advantage of the high velocity system is that at the higher velocities characteristic of this system heat transfer between the walls of the heat exchange means and the reactants is very efficient as the gas film resistance is minimized.

With regard to the heat transfer mechanism between the two different reaction zones, this method of heat transfer may be applied to stationary bed reactors and fluidized dense phase reactors as well as the high velocity type of reactor. However, as previously stated the high velocity system is particularly adaptable to this type of indirect heat transfer since it has been found that the rate of heat transfer is exceptionally high.

In addition to the hydrodesulfurization of a light naphtha or gasoline fraction, a gas oil or kerosene fraction may also be simultaneously hydrodesulfurized. While the hydrodesulfurization of a naphtha fraction has particular utility in the present invention, since this fraction is subsequently subjected to hydroforming and the heat of exothermic hydrodesulfurization may be transferred to the hydroforming reaction, it is within the scope of this invention to simultaneously desulfurize gas oil or kerosene and to transfer the heat from both the desulfurization of the naphtha fraction and the gas oil fraction to the hydroforming reaction of the naphtha fraction. For such a set-up two or more heat exchangers in parallel may be employed for the hydrodesulfurization reactions using separate reactors. These heat exchangers are connected in substantially the same manner as described with respect to Figure 1 and the heat liberated by the desulfurization reactions is absorbed by a stream of the same heat transfer medium and passed to a reservoir where the vapors are compressed and then passed to the heat exchanger of the hydroforming reaction zone.

Although the invention has been described with respect to hydrodesulfurization of a suitable hydrocarbon fraction, selective oxidation of the sulfur with oxygen or air may be carried out in substantially the same manner as described with respect to the hydrodesulfurization reaction. The primary differences are the substitution of oxygen for hydrogen in the hydrodesulfurization reactor and the removal of sulfur dioxide from the effluent of the desulfurization reactor by distillation rather than by extraction or absorption. The same catalyst may be employed for oxidation of the sulfur as with the hydrodesulfurization reaction described hereinbefore. However, in oxidizing the sulfur it is preferred to use vanadium pentoxide deposited on silica gel for the sulfur removal stage.

In the previous discussion of the invention the contact material was referred to as a catalytic material, but it is within the scope of this invention that the contact material may comprise a substantial proportion of relatively inert finely-divided material such as acid treated bentonite, finely-divided charcoal, powdered silica gel, etc. The use of inert contact material in addition to the catalytic material aids in fluidization of the catalytic material which may, under certain circumstances, be difficultly fluidizable. In using an inert material in combination with the catalyst a proportion of the inert material to catalytic material is generally between about 1:10 to about 1:1 by weight.

The upgrading or improvement in quality of petroleum distillates by the combination of hydrodesulfurization and hydroforming in separate steps, as shown by Figure 1, has numerous advantages. Most large refineries, even those adequately equipped with catalytic capacity, produce a substantial amount of thermally cracked gasoline, generally as much as 25 per cent or more of the total gasoline output. The sources of these stocks are generally visbreaking or coking, cycle stock cracking and straight run naphtha reforming operations. By today's standards the quality of such fractions is comparatively low, averaging perhaps 70 C. F. R. M. octane, with poor stability and tetraethyl lead response. In addition, these thermally cracked fractions are frequently high in sulfur compounds which are not removable by conventinoal methods. In the past such fractions have been disposed of or utilized by dilution, i. e., blending with higher quality gasolines from catalytic cracking or hydroforming. However, in view of present day standards of increased quality and the amount of increase in sour crudes, the utilization of such thermally cracked fractions is becoming a critical problem to many refiners.

Hydroforming alone is not a satisfactory solution to the above problem because of the low yield of product of suitable octane number, high coke yields, the requirement for corrosion resisting materials of construction, and the pollution of the surrounding atmosphere with sulfur compounds. The combination process of hydrodesulfurization and hydroforming has, therefore, become of great importance and the need for improving the efficiency and operability of such processes is apparent. The combination process as described with respect to Figure 1 overcomes essentially all of the above difficulties and is commercially feasible, particularly when the use of a high velocity concurrent system is employed.

As previously stated, Figure 2 of the drawing is a diagrammatic illustration of multi-stage heat exchange which may be conveniently employed on hydrodesulfurization reactor 9 and hydroforming reactor 41 of Figure 1. The use of the multi-stage heat exchange on the reactors, as shown, enables more close temperature control of the process. For example, the heat release or heat absorption at various points in the reactors may vary and, as a result, the quantity of heat to be removed or added must be correspondingly varied, which temperature control by a single heat exchanger is difficult. Further, it may be desirable to maintain different temperature levels at different points in the reactors which can be achieved best by the use of multi-stage heat exchange. The arrangement of apparatus in Figure 2 is a suitable set-up for maintaining different temperature levels $T_1$, $T_2$, $T_3$ and $T_4$ in reactors 9 and 41 of Figure 1. It is to be understood, however, that the same set-up may be used when the quantity of heat to be removed is different at different points in the reactors, even when $T_1$ and $T_2$, and $T_3$ and $T_4$ are to be maintained at substantially the same levels, respectively. According to Figure 2, temperature $T_1$ is maintained substantially constant by maintaining a pressure $P_1$ in reservoir 101 such that the heat exchange fluid boils at a temperature suitably related to $T_1$. The liquid heat exchange medium, such as mercury, is passed from reservoir 101 under pressure $P_1$ through conduit 102 to heat exchanger 103 where the liquid boils at a temperature corresponding to pressure $P_1$. The vapors of the heat exchange medium are removed from heat exchanger 103 through conduit 104 and returned to reservoir 101. Vapors are removed from reservoir 101 through conduit 106 to be passed to the heat exchange unit of hydroforming reactor 41 as to be discussed further hereinafter. In another portion of reactor 9, temperature $T_2$ is maintained by adjusting the pressure $P_2$ of reservoir 107 at the required value. Liquid heat exchange medium is withdrawn from reservoir 107 through conduit 108 and passed to heat exchanger 109. In heat exchanger 109, the liquid heat exchange medium is vaporized at a temperature corresponding to pressure $P_2$. Vaporous heat exchange medium is withdrawn from heat exchanger 109 through conduit 111 and passed to reservoir 107. Vaporous heat exchange medium is withdrawn from reservoir 107 through conduit 112 to be passed to the heat exchange unit of hydroforming reactor 41 as to be discussed hereinafter.

The exothermic heat of hydrodesulfurization unit 9 is made available to hydroforming unit 41 by passing the vaporized heat exchange medium from conduit 106 to compressor 116. In compressor 116, the vapors are compressed in a similar manner as described with respect to Figure 1 to pressure $P_3$ which corresponds to the pressure necessary to maintain a temperature of the heat exchange medium suitably related to temperature $T_3$ at that particular point shown in reactor 41. The compressed vapors are passed from compressor 116 through conduit 117 to heat exchanger 118. In heat exchanger 118 the compressed vapors are condensed at a temperature corresponding to pressure $P_3$, giving up their latent heat of condensation to the reaction mixture in the upper portion of reactor 41. Condensed heat exchange medium is passed from heat exchanger 118 through conduit 119 to conduit 121 and then returned to reservoir 101 after expansion through an expansion valve in line 119. Similarly, vaporous heat exchange medium from reservoir 107 is passed through conduit 112 to compressor 123. The vaporous heat exchange medium is compressed to a pressure $P_4$ in compressor 123. The compressed vapors are passed from compressor 123 through conduit 124 to heat exchanger 126. In heat exchanger 126, the compressed vapors are condensed at a temperature corresponding to pressure $P_4$ and give up their latent heat of condensation to the reactants in the lower portion of hydroformer 41. Condensate is passed from heat exchanger 126 through conduit 127 and an expansion valve to reservoir 107.

If the exothermic heat of the hydrodesulfurization reaction effected in reactor 9 is greater than that necessary to supply heat to the endothermic reaction effected in reactor 41 and to maintain the temperature at the desired level or levels therein, a portion of the vapors in conduits 106 and/or 112 is removed therefrom through conduit 131 and passed through conduit 132 to condenser 133. This portion of the vapors is condensed in condenser 133. From condenser and cooler 133 condensate is returned to the system through conduits 134 and 136. This condensate may be passed directly to reservoir 101 or directly to reservoir 107 or may be split and passed in the appropriate proportions to both reservoirs 101 and 107 as shown. In some instances the amount of heat available from hydrodesulfurization reactor 9 or from any exothermic reaction which may be effected therein and the compression of the heat exchange vapor may be insufficient to supply the required amount of heat to the reaction effected in reactor 41. In such case the additional heat required is obtained by passing condensate from conduits 119 and/or 127 through conduit 138 and conduit 139 to vaporizer 141. In vaporizer 141, the required amount of make-up heat is added to the system by the vaporization of that portion of the condensate removed through conduit 138. The vapors produced in heater 141 are passed through conduit 136 and returned to the system through conduit 121 and/or conduit 127. These vapors may be passed directly to reservoir 101, or reservoir 107, or may be split and passed in appropriate proportions to reservoirs 101 and 107, respectively.

The above arrangement of apparatus is an effective manner for maintaining different temperature levels in the exothermic and endothermic reactors as well as maintaining a constant temperature throughout the reactors where the heat liberated or absorbed is different for different locations within the reactors. Numerous combinations are available in the arrangement shown in Figure 2. Temperature $T_1$ may be higher than temperature $T_2$ and temperature $T_3$ may be higher than temperature $T_4$ in one combination. In another combination, $T_1$ and $T_2$ may be at the same temperature level and $T_3$ and $T_4$ may be at the same but higher temperature level, but the heat duty at $T_2$, $T_3$ and $T_4$ may be different as the result of different rates of reaction at each locality. In still another combination, $T_2$ may be greater than $T_1$ and $T_4$ may be greater than $T_3$. It is also within the scope of this invention to have the temperature of $T_1$ less than the temperatur eof $T_2$ but at the same time having temperature $T_3$ greater than temperature $T_4$. In each of the above combinations pressures $P_1$, $P_2$, $P_3$ and $P_4$ must be adjusted accordingly.

The arrangement of apparatus and heat exchangers of Figure 2 are particularly adaptable where a second exothermic reaction (not shown) is being effected in the overall process, from which additional heat may be available for heating up the reaction in the endothermic reactor such as in reactor 41. For example, a heat exchanger may be inserted in the catalyst regeneration zone, such as regenerator 59 of Figure 1, and connected to the heat exchange system in a manner similar to heat exchanger 103 or 109. The regeneration of the catalyst is largely achieved by oxidation of carbonaceous deposits, which reaction is exothermic. The arrangement shown in Figure 2 may also be employed when a gas oil or reduced crude is being hydrodesulfurized in a separate reactor from which heat may be made available by the system disclosed in Figure 2.

The multi-stage heat exchange system of Figure 2 is particularly adaptable where multi-stage hydrodesulfurization is effective as the heat liberated in each stage of the hydrodesulfurization may be different and, therefore, to take advantage of this liberated heat it is necessary to employ separate heat exchangers for each zone and pass the heat thus recovered to the endothermic zone, such as endothermic zone 41 of Figure 1. Figure 3 is a diagrammatic illustration of an arrangement of apparatus for effecting multi-stage hydrodesulfurization. Multi-stage hydrodesulfurization is particularly advantageous, as previously pointed out, since in fluidized processes it is substantially impossible to obtain maximum or high degree of desulfurization unless some provision is made for minimizing internal circulation of catalysts and reactants. Fluidized hydrodesulfurization can best be effected by the concurrent high velocity process, and maximum efficiency even of this process is achieved by effecting the desulfurization reaction in stages. According to this modification of the invention, a suitable naphtha feed stock containing sulfur is passed through conduit 151 to heater and vaporizer 153. Make-up hydrogen is introduced into conduit 151 through conduit 152. Vaporized naphtha is passed through conduit 154 to a first stage hydrodesulfurization reactor 156. Contact material is introduced into the stream of vaporized naphtha and hydrogen in conduit 154 through conduit 178. The reactants and contact material pass upwardly through reactor 156 in contact with heat exchanger 157. The effluent from the first stage hydrodesulfurization containing entrained catalyst is passed through conduit 159 to catalyst separator 161. In catalyst separator 161 catalyst is separated from naphtha, hydrogen sulfide and hydrogen and settles into stripper 162. Separator 161 and stripper 162 are substantially the same as the corresponding separator and stripper described in Figure 1 of the drawings. A suitable stripping gas, such as hydrogen or steam, is introduced into stripper 162 through conduit 163. Stripped catalyst is removed from stripper 162 through a conduit or standpipe 164.

The partially desulfurized naphtha and hydrogen are removed from separator 161 through conduit 168 and passed to the second stage hydrodesulfurization unit 169, in which desulfurization of the feed stock is completed. Stripped catalyst from the first stage reaction is introduced into conduit 168 through conduit 166, as shown. A portion of this stripped catalyst may be recycled to the first stage desulfurization unit 156 through conduit 167, if desired. Vaporized naphtha, hydrogen and entrained catalyst are passed upwardly through second stage reactor 169 in contact with heat exchanger 171. The effluent from the second stage hydrodesulfurization unit 169 is withdrawn through conduit 172 and passed to catalyst separator 173 in which entrained catalyst is separated from the reaction effluent. The entrained catalyst settles into stripper 174. A suitable stripping gas such as hydrogen or steam is introduced into stripper 174 through conduit 176. Separator 173 and stripper 174 are substantially the same as separator 161 and stripper 162. Stripped catalyst is withdrawn from stripper 174 and passed to inlet conduit 154 through conduits or standpipes 177 and 178. A portion of the stripped catalyst from the second stage desulfurization unit may be recycled to conduit 168 through conduit 179, if desired.

The naphtha effluent substantially free from organically combined sulfur is removed from separator 173 through conduit 181 and passed through conduit 182 to a conventional condensation stage 183. The condensation stage 183 may comprise a series of condensation units at the same pressure or at successively lower pressures. Condensate is passed from condenser 183 to accumulator 184. From accumulator 184, the desulfurized naphtha is withdrawn through conduit 186 as a product of the process. The fraction recovered from conduit 186 may be subjected to further treatment, such as hydroforming. Uncondensed vapors comprising hydrogen, hydrogen sulfide, methane, ethane and other relatively low boiling hydrocarbons are removed from accumulator 184 through conduit 187 and a portion of this vaporous stream may be vented to the atmosphere to prevent the build-up of ethane and methane in the process. A major proportion of the vapor stream is recycled after removal of hydrogen sulfide as in Figure 1, through conduit 188 to feed line 154 to supply the added hydrogen to the process. A portion of the vapor stream containing hydrogen may be passed through conduit 189 to conduit 168 in order to control the hydrogen content of reactor 169 independent of reactor 156, if desired.

It is preferred to introduce fresh catalyst into the system through conduits 192 or 193 between the first and second stage of the process. A portion of the effluent withdrawn from the first stage of the process may be by-passed and passed to condenser 183 through conduit 191, if desired.

In the arrangement of apparatus shown, heat exchanger 157 may conveniently constitute heat exchanger 109 of Figure 2 and heat exchanger 171 may constitute heat exchanger 103 of Figure 2. Heat exchanger 157 and 171 may also be connected in series as a single exchanger and connected in the system like shown in Figure 1.

In general, the reaction conditions and method of operation are similar to those described with respect to the hydrodesulfurization unit 9 of Figure 1. It is possible and often desirable to maintain the first and second stage desulfurization at different conditions when using a multi-stage hydrodesulfurization process. Thus, it is desirable to maintain the second stage hydrodesulfurization reaction at a temperature at least 50° F. higher than the first stage and preferably above 800° F., but within the range disclosed with respect to reactor 9 of Figure 1. At such higher temperature in reactor 169, desorption, vaporization and destructive hydrogenation of carbonaceous deposits and tars deposited upon the catalyst is effected and a material increase in the length of the catalyst life is observed. Under optimum operating conditions regeneration of the catalyst may be eliminated entirely. It may also be desirable to maintain the hydrogen content in the second stage hydrodesulfurization higher than the first stage. In the preferred modification of Figure 3, the hydrogen content in terms of mol ratio of the first stage is maintained approximately half that of the second stage but within the range as disclosed with respect to reactor 9 of Figure 1. It may be also desirable to maintain the reaction pressure of the second stage hydrodesulfurization at a higher pressure than in the first stage. In such a modification, the hydrogen content of the reaction mixture may be substantially the same in both stages, but the partial pressure of the hydrogen may be substantially greater in the second stage. Increase in pressure has a similar effect as an increase in temperature and aids in the destructive hydrogenation of carbonaceous and tarry deposits from the catalyst. Under the preferred operation conditions for the two-stage process of Figure 3 between about 50 and about 70 per cent of the organic sulfur is converted in the first stage and the remainder of the sulfur up to about 90 to 100 per cent is converted in the second stage. Although only two stages of operation are shown for the modification of the invention of Figure 3, three and four stages or more may be employed without departing from the scope of this modification.

A similar operating technique of multi-stage operation may be employed to effect hydroforming. In hydroforming by multistage process the operation is carried out substantially the same as that described with respect to Figure 3. It is particularly desirable in the case of hydroforming to carry out the second or last stage of the process at a higher temperature than the first stage in order to complete aromatization. A temperature increase of at least 25° F. is preferred in the case of hydroforming in a multi-stage process.

It is within the scope of the present invention to employ a condensation step between the first and second stage of the multi-stage process described with respect to Figure 3. Condensation between stages may be desirable in order to have independent control over the quantity and quality of recycle gases to the respectively stages. It may also be desirable to remove the hydrogen sulfide between stages and, consequently, condensation of the effluent from the first stage will be necessary as described with respect to Figure 1.

In another modification of the present invention, the hydrodesulfurization step may employ the high velocity technique as shown in Figures 1 and 3 followed by a hydroforming step conducted in such a manner as to maintain the catalyst in the so-called pseudo-liquid dense phase condition. This particular type of operation may be desirable in order to obtain increased contact times in the second hydroforming reaction step, whereas the high velocity type of operation may be preferable for the hydrodesulfurization type because of the relatively short contact times permissible.

The drawings of the present invention diagrammatically illustrate various modifications of the invention. Various pieces of equipment such as compressors, storage vessels, condensers and coolers, fractionation and extraction equipment, etc., have been eliminated from the drawings as a matter of convenience and clarity and their use and location will become apparent to those skilled in the art.

Although the invention has been described with particular reference to dehydrodesulfurization and hydroforming, the invention may be applied to other combination processes employing both exothermic and endothermic reactions in which the exothermic reaction is carried out at a lower temperature than the endothermic reaction. For example, the invention applies to synthesis gas making and synthesis, hydrogenation and hydroforming, synthesis reaction and catalytic cracking or reforming of a product thereof, synthetic phenol—(1) chlorination of benzene and (2) hydrolysis of chlorobenzene, and many other chemical processeh.

I claim:

1. In an integrated process for effecting chemical reactions involving the reaction steps comprising an exothermic reaction and an endothermic reaction, such as hydrodesulfurization and hydroforming, selective oxidation of sulfur and hydroforming, synthesis gas making and synthesis, hydrogenation and hydroforming, synthesis and catalytic cracking of synthesis product, synthesis and reforming of synthesis product, and chlorination of benzene and hydrolysis of cholorobenzene in which reactant is passed successively through the reaction steps and in which the exothermic reaction step is effected at a temperature not higher than the endothermic reaction step and the heat released by the exothermic reaction step is not equivalent to the heat required by the endothermic reaction step, the method for supplying the required heat for the endothermic reaction which comprises indirectly contacting with the exothermic reaction a vaporizable heat exchange liquid under a pressure such that heat exchange liquid is vaporized at a temperature suitably related to the temperature of reaction, compressing vapor thus produced by indirect heat exchange with said exothermic reaction, indirectly contacting with the endothermic reaction vapor thus compressed at a pressure such that vapor is condensed at a temperature suitably related to the temperature of reaction, returning condensate produced by heat exchange with the endothermic reaction at a lower pressure for heat exchange with the exothermic reaction, removing a portion of the heat exchange medium from the above heat exchange cycle, regulating the heat content of this portion of the heat exchange medium removed from the heat exchange cycle to balance the heat requirement of the system, and thereafter returning this latter portion of the heat exchange medium to the heat exchange cycle.

2. In an integrated process for effecting chemical reactions involving the reaction steps comprising an exothermic synthesis reaction and an endothermic cracking reaction in which reactant is passed successively through the reaction steps and in which the exothermic reaction step is effected at a temperature not higher than the endothermic reaction step and the heat released by the exothermic reaction step is greater than the heat required by the endothermic step, the method for supplying the required heat for the endothermic reaction which comprises indirectly contacting with the exothermic reaction a vaporizable heat exchange liquid under a pressure such that heat exchange liquid is vaporized at a temperature suitably related to the temperature of reaction, compressing a major proportion of the vapor thus produced by indirect heat exchange with said exothermic reaction, indirectly contacting with the endothermic reaction vapor thus compressed at a pressure such that vapor is condensed at a temperature suitably related to the temperature of reaction, returning condensate produced by heat exchange with the exothermic reaction at a lower pressure for heat exchange with the exothermic reaction, removing a minor proportion of the heat exchange vapor from the above heat exchange cycle, condensing the vapor thus removed from the heat exchange cycle, and thereafter returning the resulting condensate to the heat exchange cycle.

3. In an integrated process for effecting chemical reactions involving the reaction steps comprising an exothermic synthesis reaction and an endothermic gas making reaction in which reactant is passed successively through the reaction steps and in which the exothermic reaction step is effected at a temperature not higher than the endothermic reaction step and the heat released by the exothermic reaction step is less than that heat required by the endothermic reaction step, the method for supplying the required heat for the endothermic reaction which comprises indirectly contacting with the exothermic reaction a vaporizable heat exchange liquid under a pressure such that heat exchange liquid is vaporized at a temperature suitably related to the temperature of reaction, compressing the vapor thus produced by indirect heat exchange with said exothermic reaction, indirectly contacting with the endothermic reaction vapor thus compressed at a pressure such that vapor is condensed at a temperature suitably related to the temperature of reaction, returning a major proportion of the condensate produced by heat exchange with the endothermic reaction at a lower pressure for heat exchange with the exothermic reaction, removing a minor proportion of the condensate produced by heat exchange with the endothermic reaction from the above heat exchange cycle, vaporizing the condensate thus removed from the heat exchange cycle, and thereafter returning the resulting vapor to the heat exchange cycle.

4. In an integrated process for effecting chemical reactions involving the reaction steps comprising an exothermic hydrodesulfurization reaction and an endothermic hydroforming reaction in which reactant is passed successively through the reaction steps and in which the exothermic reaction step is effected at a temperature not higher than the endothermic reaction step and the heat released by the exothermic reaction step is not equivalent to the heat required by the endothermic reaction step, the method for supplying the required heat for the endothermic reaction which comprises a plurality of heat exchange circuits between said exothermic and said endothermic reaction steps, each of said heat exchange circuits comprising indirectly contacting with the exothermic reaction a vaporizable heat exchange liquid under a pressure such that heat exchange liquid is vaporized at a temperature suitably related to the desired reaction temperature, compressing vapor thus produced by indirect heat exchange with said exothermic reaction, indirectly contacting with the endothermic reaction vapor thus compressed at a pressure such that vapor is condensed at a temperature suitably related to the desired reaction temperature, returning condensate produced by heat exchange with the endothermic reaction at a lower pressure for heat exchange with the exothermic reaction and to complete the heat exchange circuit, removing a portion of the heat exchange medium from the plurality of heat exchange circuits, regulating the heat content of this portion of the heat exchange medium removed from the plurality of heat exchange circuits to balance the heat requirement of the entire system, and thereafter returning this latter portion of the heat exchange medium to the plurality of heat exchange circuits.

5. In an integrated process for effecting chemical reactions involving the reaction steps comprising an exothermic reaction and an endothermic reaction, such as hydrodesulfurization and hydroforming, selective oxidation of sulfur and hydroforming, synthesis gas making and synthesis, hydrogenation and hydroforming, synthesis and catalytic cracking of synthesis product, synthesis and reforming of synthesis product, and chlorination of benzene and hydrolysis of chlorobenzene in which reactant is passed successively through the reaction steps and in which the exothermic reaction step is effected at a temperature not higher than the endothermic reaction step, the method for supplying the required heat for the endothermic reaction which comprises indirectly contacting with the exothermic reaction a vaporizable heat exchange liquid under a pressure such that heat exchange liquid is vaporized at a temperature suitably related to the temperature of reaction, compressing vapor thus produced by indirect heat exchange with said exothermic reaction, indirectly contacting with the endothermic reaction vapor thus compressed at a pressure such that vapor is condensed at a temperature suitably related to the temperature of reaction, and returning condensate produced by heat exchange with the endothermic reaction at a lower pressure for heat exchange with the exothermic reaction.

6. In an integrated process for effecting chemical reactions involving the reaction steps comprising an exothermic reaction and an endothermic reaction, such as hydrodesulfurization and hydroforming, selective oxidation of sulfur and hydroforming, synthesis gas making and synthesis, hydrogenation and hydroforming, synthesis and catalytic cracking of synthesis product, synthesis and reforming of synthesis product, and chlorination of benzene and hydrolysis of chlorobenzene in which reactant is passed successively through the reaction steps and in which the exothermic reaction step is effected at a temperature not higher than the endothermic reaction step, the method for supplying the required heat for the endothermic reaction which comprises a plurality of heat exchange circuits between said exothermic and said endothermic reaction steps, each of said heat exchange circuits comprising indirectly contacting with the exothermic reaction a vaporizable heat exchange liquid under a pressure such that heat exchange liquid is vaporized at a temperature suitably related to the desired reaction temperature, compressing vapor thus produced by indirect heat exchange with said exothermic reaction, indirectly contacting with the endothermic reaction vapor thus compressed at a pressure such that vapor is condensed at a temperature suitably related to the desired reaction temperature, and returning condensate produced by heat exchange with the endothermic reaction at a lower pressure for heat exchange with the exothermic reaction and to complete the heat exchange circuit.

7. In an integrated process for effecting chemical reactions involving successive steps comprising an exothermic relatively low temperature hydrogenation reaction and a subsequent endothermic higher temperature hydroforming reaction, the improvement which comprises vaporizing a liquid by indirect heat exchange with said exothermic reaction, compressing vapor thus produced, condensing vapor thus compressed by indirect heat exchange with said endothermic reaction, and returning resulting condensate to said exothermic reaction whereby heat is transferred from said relatively low temperature exothermic reaction to said higher temperature endothermic reaction.

8. In an integrated process for effecting chemical reactions involving successive steps comprising a relatively low temperature exothermic selective oxidation of sulfur reaction and a higer temperature endothermic hydroforming reaction, the improvement which comprises vaporizing a liquid by indirect heat exchange with said exothermic reaction, passing vapor thus produced to an accumulation zone, removing a portion of the vapor from said accumulation zone, compressing the aforesaid portion of vapor from said accumulation zone, condensing vapor thus compressed by heat exchange with said endothermic reaction, passing resulting condensate from said endothermic reaction to said accumulation zone, passing condensate from said accumulation zone in heat exchange with said exothermic reaction to vaporize same as aforesaid, removing another portion of the vapor from said accumulation zone, separately condensing this latter portion of the vapor from said accumulation zone, and returning resulting condensate to said accumulation zone.

9. In an integrated process for the treatment of a hydrocarbon fraction containing sulfur to remove sulfur and to improve the motor fuel quality thereof involving the successive steps comprising hydrodesulfurization at a relatively low temperature and the subsequent hydroforming of the desulfurized stock at a higher temperature, the improvement which comprises vaporizing liquid by indirect heat exchange with the hydrodesulfurization reaction, compressing vapor thus produced, condensing vapor thus compressed by indirect heat exchange with the hydroforming reaction and returning condensate from heat exchange with the hydroforming reaction for heat exchange with the hydrodesulfurization reaction whereby heat is transferred from said relatively low temperature hydrodesulfurization reaction to said higher temperature hydroforming reaction.

10. In an integrated process for the treatment of a hydrocarbon fraction containing sulfur to remove sulfur therefrom and to increase the aromatic content thereof involving the successive steps comprising hydrodesulfurization at a relatively low temperature and the subsequent hydroforming of the desulfurized feed stock at a higher temperature, the improvement which comprises vaporizing a hydrocarbon feed stock containing sulfur and passing same upward through an elongated hydrodesulfurization zone in the presence of a finely-divided catalyst at a gas velocity effective to suspend the finely-divided catalyst in the gaseous reaction mixture and to move finely-divided catalyst in the direction of flow of the gaseous reaction mixture through said hydrodesulfurization zone, removing from said hydrodesulfurization zone an effluent containing entrained finely-divided catalyst and hydrogen sulfide, removing hydrogen sulfide and finely-divided catalyst from said effluent of said hydrodesulfurization zone, passing the effluent of said hydrodesulfurization zone substantially free from hydrogen sulfide and in the vapor state upwardly through the elongated hydroforming zone in the presence of a finely-divided catalyst at a gas velocity effective to suspend the finely-divided catalyst in said gaseous mixture and to move finely-divided catalyst in the direction of flow of the gaseous mixture through said hydroforming zone, removing from said hydroforming zone an effluent of increased aromatic content and containing entrained finely-divided catalyst, separating finely-divided catalyst from the effluent of said hydroforming zone, recovering the hydroforming effluent as a product of the process, passing separated catalyst from said hydrodesulfurization effluent to said hydroforming reaction zone and passing separated catalyst from said hydroforming effluent to said hydrodesulfurization reaction zone, maintaining the hydrodesulfurization zone at a temperature between about 700 and about 925° F. and maintaining the hydroforming zone at a temperature between about 875 and about 950° F., maintaining the pressure of both the hydrodesulfurization zone and the hydroforming zone between about 300 and about 750 pounds per square inch gage, effecting both the hydrodesulfurization reaction and hydroforming reaction in the presence of free hydrogen, the mol ratio of free hydrogen to charging stock to the hydrodesulfurization reaction being between about 2:1 and about 9:2 and the mol ratio of free hydrogen to charging stock to said hydroforming reaction zone being between about 1:1 and about 8:1, indirectly contacting with the hydrodesulfurization reaction a vaporizable heat exchange liquid under a pressure such that heat exchange liquid is vaporized at a temperature suitably related to the temperature of reaction, compressing a major proportion of the vapor thus produced by indirect exchange with said hydrodesulfurization reaction, indirectly contacting with the hydroforming reaction vapor thus compressed at a pressure such that vapor is condensed at a temperature suitably related to the temperature of reaction, returning condensate produced by heat exchange with the hydroforming reaction at a lower pressure for heat exchange with the hydrodesulfurization reaction, removing a minor proportion of the heat exchange vapor from the above heat exchange cycle, condensing this portion of the heat exchange vapor removed from the heat exchange cycle, and thereafter returning this latter portion of the heat exchange vapor to the heat exchange cycle.

11. In an integrated process for the treatment of a hydrocarbon fraction containing sulfur to remove sulfur therefrom and to increase the aromatic content thereof involving the successive steps comprising hydrodesulfurization at a relatively low temperature and the subsequent hydroforming of the desulfurized feed stock at a higher temperature, the improvement which comprises vaporizing a hydrocarbon feed stock containing sulfur and passing same upward through an elongated hydrodesulfurization zone in the presence of a finely-divided catalyst at a gas velocity effective to suspend the finely-divided catalyst in the gaseous reaction mixture and to move finely-divided catalyst in the direction of flow of the gaseous reaction mixture through said hydrodesulfurization zone, removing from said hydrodesulfurization zone an effluent containing entrained finely-divided catalyst and hydrogen sulfide, removing hydrogen sulfide and finely-divided catalyst from said effluent of said hydrodesulfurization zone, passing the effluent of said hydrodesulfurization zone substantially free from hydrogen sulfide and in the vapor state upwardly through the elongated hydroforming zone in the presence of a finely-divided catalyst at a gas velocity effective to suspend the finely-divided catalyst in said gaseous mixture, removing from said hydroforming zone an effluent of increased aromatic content, recovering the hydroforming effluent as a product of the process, maintaining the hydrodesulfurization zone at a temperature between about 700 and about 925° F. and maintaining the hydroforming zone at a temperature between about 875 and about 950° F., maintaining the pressure of both the hydrodesulfurization zone and the hydroforming zone between about 300 and about 750 pounds per square inch gage, effecting both the hydrodesulfurization reaction and hydroforming reaction in the presence of free hydrogen, the mol ratio of free hydrogen to charging stock to the hydrodesulfurization reaction being between about 2:1 and about 9:2 and the mol ratio of free hydrogen to charging stock to said hydroforming reaction zone being between about 1:1 and about 8:1, indirectly contacting with the hydrodesulfurization reaction a vaporizable heat exchange liquid under a pressure such that heat exchange liquid is vaporized at a temperature suitably related to the temperature of reaction, compressing vapor thus produced by indirect exchange with said hydrodesulfurization reaction, indirectly contacting with the hydroforming reaction vapor thus compressed at a pressure such that vapor is condensed at a temperature suitably related to the temperature of reaction, and returning condensate produced by heat exchange with the hydroforming reaction at a lower pressure for heat exchange with the hydrodesulfurization reaction.

12. The improved process of claim 11 in which the hydrodesulfurization reaction is effected in a plurality of successive stages with catalyst separation between stages and in which the vaporizable heat exchange liquid is indirectly contacted with the reaction effected in each stage.

13. In an integrated process for the treatment of a hydrocarbon fraction containing sulfur to remove sulfur therefrom and to increase the aromatic content thereof involving the successive steps comprising hydrodesulfurization at a relatively low temperature and the subsequent hydroforming of the desulfurized feed stock at a higher temperature, the improvement which comprises vaporizing a hydrocarbon feed stock containing sulfur and passing same upward through an elongated hydrodesulfurization zone in the presence of a finely-divided catalyst at a gas velocity effective to suspend the finely-divided catalyst in the gaseous reaction mixture and to move finely-divided catalyst in the direction of flow of the gaseous reaction mixture through said hydrodesulfurization zone, removing from said hydrodesulfurization zone an effluent containing entrained finely-divided catalyst and hydrogen sulfide, removing hydrogen sulfide and finely-divided catalyst from said effluent of said hydrodesulfurization zone, passing the effluent of said hydrodesulfurization zone substantially free from hydrogen sulfide and in the vapor state upwardly through the elongated hydroforming zone in the presence of a finely-divided catalyst at a gas velocity effective to suspend the finely-divided catalyst in said gaseous mixture and to move finely-divided catalyst in the direction of flow of the gaseous mixture through said hydroforming zone, removing from said hydroforming zone an effluent of increased aromatic content and containing entrained finely-divided catalyst, separating finely-divided catalyst from the effluent of said hydroforming zone, recovering the hydroforming effluent as a product of the process, passing separated catalyst from said hydrodesulfurization effluent to said hydroforming reaction zone and passing separated catalyst from said hydroforming effluent to said hydrodesulfurization reaction zone, indirectly contacting with the hydrodesulfurization reaction a vaporizable heat exchange liquid under a pressure such that heat exchange liquid is vaporized at a temperature suitably related to the temperature of reaction, compressing a major proportion of the vapor thus produced by indirect exchange with said hydrodesulfurization reaction, indirectly contacting with the hydroforming reaction vapor thus compressed at a pressure such that vapor is condensed at a temperature suitably related to the temperature of reaction, returning condensate produced by heat exchange with the hydroforming reaction at a lower pressure for heat exchange with the hydrodesulfurization reaction, removing a minor proportion of the heat exchange vapor from the above heat exchange cycle, condensing this portion of the heat exchange vapor removed from the heat exchange cycle, and thereafter returning this latter portion of the heat exchange vapor to the heat exchange cycle.

14. In an integrated process for the treatment of a hydrocarbon fraction containing sulfur to remove sulfur therefrom and to increase the aromatic content thereof involving the successive steps comprising hydrodesulfurization at a relatively low temperature and the subsequent hydroforming of the desulfurized feed stock at a higher temperature, the improvement which comprises vaporizing a hydrocarbon feed stock containing sulfur and passing same upward through an elongated hydrodesulfurization zone in the presence of a finely-divided catalyst at a gas velocity effective to suspend the finely-divided catalyst in the gaseous reaction mixture and to move finely-divided catalyst in the direction of flow of the gaseous reaction mixture through said hydrodesulfurization zone, removing from said hydrodesulfurization zone an effluent containing entrained finely-divided catalyst and hydrogen sulfide, removing hydrogen sulfide and finely-divided catalyst from said effluent of said hydrodesulfurization zone, passing the effluent of said hydrodesulfurization zone substantially free from hydrogen sulfide and in the vapor state upwardly through the elongated hydroforming zone in the presence of a finely-divided catalyst at a gas velocity effective to suspend the finely-divided catalyst in said gaseous mixture, removing from said hydroforming zone an effluent of increased aromatic content, recovering the hydroforming effluent as a product of the process, indirectly contacting with the hydrodesulfurization reaction a vaporizable heat exchange liquid under a pressure such that heat exchange liquid is vaporized at a temperature suitably related to the temperature of reaction, compressing vapor thus produced by indirect exchange with said hydrosulfurization reaction, indirectly contacting with the hydroforming reaction vapor thus compressed at a pressure such that vapor is condensed at a temperature suitably related to the temperature of reaction, and returning condensate produced by heat exchange with the hydroforming reaction at a lower pressure for heat exchange with the hydrodesulfurization reaction.

NORMAN L. DICKINSON.

References Cited in the file of this patent

UNITED STATES PATENTS

| Number | Name | Date |
|---|---|---|
| 2,139,351 | Bejarano | Dec. 6, 1938 |
| 2,217,703 | Pew et al. | Oct. 15, 1940 |
| 2,224,014 | Dunham et al. | Dec. 3, 1940 |
| 2,331,433 | Simpson et al. | Oct. 12, 1943 |
| 2,378,607 | Watts | June 19, 1945 |
| 2,413,312 | Cole | Dec. 31, 1946 |
| 2,417,308 | Lee | Mar. 11, 1947 |
| 2,450,724 | Grote | Oct. 5, 1948 |
| 2,488,027 | Page | Nov. 15, 1949 |
| 2,498,559 | Layng et al. | Feb. 21, 1950 |